(12) United States Patent
Hakura et al.

(10) Patent No.: US 10,078,911 B2
(45) Date of Patent: Sep. 18, 2018

(54) SYSTEM, METHOD, AND COMPUTER PROGRAM PRODUCT FOR EXECUTING PROCESSES INVOLVING AT LEAST ONE PRIMITIVE IN A GRAPHICS PROCESSOR, UTILIZING A DATA STRUCTURE

(71) Applicant: NVIDIA Corporation, Santa Clara, CA (US)

(72) Inventors: Ziyad Sami Hakura, Gilroy, CA (US); Yury Uralsky, Santa Clara, CA (US); Tyson Bergland, San Francisco, CA (US); Eric Brian Lum, San Jose, CA (US); Jerome F. Duluk, Palo Alto, CA (US); Henry Packard Moreton, Woodside, CA (US)

(73) Assignee: NVIDIA Corporation, Santa Clara, CA (US)

( * ) Notice: Subject to any disclaimer, the term of this patent is extended or adjusted under 35 U.S.C. 154(b) by 426 days.

(21) Appl. No.: 13/843,981

(22) Filed: Mar. 15, 2013

(65) Prior Publication Data

US 2014/0267260 A1 Sep. 18, 2014

(51) Int. Cl.
*G09G 5/14* (2006.01)
*G06T 15/00* (2011.01)
*H04N 13/00* (2018.01)

(52) U.S. Cl.
CPC ............. *G06T 15/005* (2013.01); *G09G 5/14* (2013.01); *H04N 13/0022* (2013.01); *H04N 2013/0081* (2013.01)

(58) Field of Classification Search
CPC ....... G06T 17/20; G06T 17/05; G06T 17/205; G06T 17/005; G06T 17/30; G06T 17/00; G06T 15/04; G06T 15/005; G06T 15/06; G06T 15/80; G06T 15/40; G06T 15/50; G06T 15/506; G06T 15/405; G06T 11/40; G02B 27/225; H04N 13/0022; H04N 2013/0081; G09G 5/14

See application file for complete search history.

(56) References Cited

U.S. PATENT DOCUMENTS

| | | | | |
|---|---|---|---|---|
| 6,167,159 | A * | 12/2000 | Touma et al. ................. | 382/242 |
| 6,525,737 | B1 * | 2/2003 | Duluk, Jr. ................ | G06T 1/60 |
| | | | | 345/502 |
| 7,602,395 | B1 * | 10/2009 | Diard ........................... | 345/505 |
| 8,310,482 | B1 | 11/2012 | Hakura et al. | |
| 2008/0165199 | A1 * | 7/2008 | Wei et al. ..................... | 345/506 |
| 2008/0309660 | A1 * | 12/2008 | Bertolami et al. ........... | 345/419 |

(Continued)

OTHER PUBLICATIONS

Nguyen, Hubert, "GPU Gems 3" [online], NVidia, 2008 [retrieved on Mar. 25, 2015]. Retrieved from the Internet: < URL: 19/03/2008> Forward and Chapter 10 ISBN-13: 978-0-321-51526-1.*

*Primary Examiner* — Diane Wills
(74) *Attorney, Agent, or Firm* — Zilka-Kotab, PC

(57) ABSTRACT

A system, method, and computer program product are provided for executing processes involving at least one primitive in a graphics processor, utilizing a data structure. In operation, a data structure is associated with at least one primitive. Additionally, a plurality of processes involving the at least one primitive are executed in a graphics processor, utilizing the data structure. Moreover, the plurality of processes include at least one of selecting at least one surface or portion thereof to which to render, or selecting at least one of a plurality of viewports.

18 Claims, 9 Drawing Sheets

(56) References Cited

U.S. PATENT DOCUMENTS

2011/0057942 A1\* 3/2011 Mantor et al. ................. 345/561
2013/0328895 A1\* 12/2013 Sellers et al. ................. 345/522
2014/0267276 A1   9/2014 Hakura et al.

\* cited by examiner

SYSTEM, METHOD, AND COMPUTER PROGRAM PRODUCT FOR EXECUTING PROCESSES INVOLVING AT LEAST ONE PRIMITIVE IN A GRAPHICS PROCESSOR, UTILIZING A DATA STRUCTURE

FIELD OF THE INVENTION

The present invention relates to graphics processors, and more particularly to efficiently processing primitives utilizing graphics processors.

BACKGROUND

Currently, graphics processing pipelines are unable to project graphics primitives to multiple viewports or render targets in an efficient manner. There is thus a need for addressing these and/or other issues associated with the prior art.

SUMMARY

A system, method, and computer program product are provided for executing processes involving at least one primitive in a graphics processor, utilizing a data structure. In operation, a data structure is associated with at least one primitive. Additionally, a plurality of processes involving the at least one primitive are executed in a graphics processor, utilizing the data structure. Moreover, the plurality of processes include at least one of selecting at least one surface or portion thereof to which to render, or selecting at least one of a plurality of viewports.

DETAILED DESCRIPTION

Figure 1:
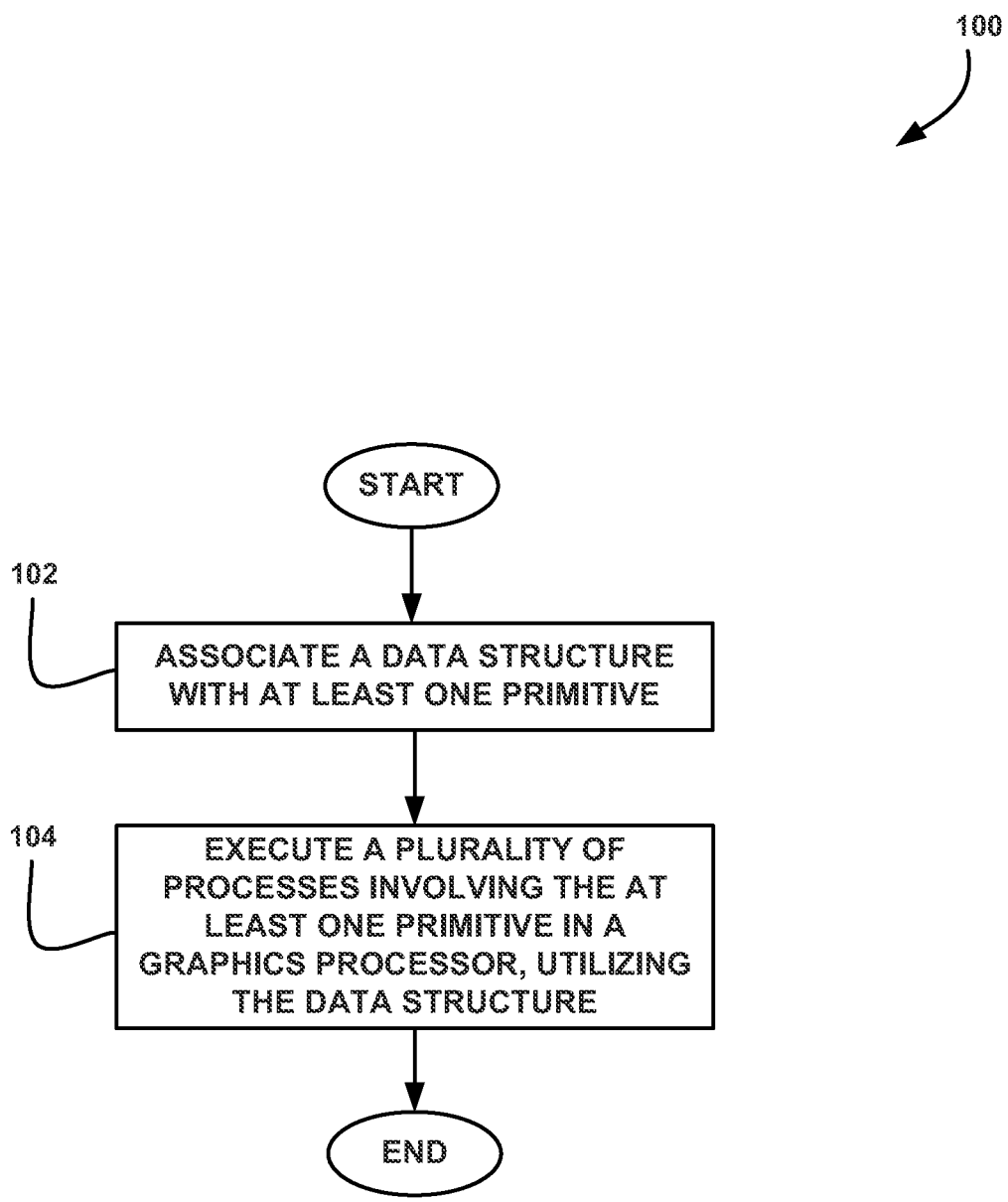
FIG. 1 shows a method for executing processes involving at least one primitive in a graphics processor, utilizing a data structure, in accordance with one embodiment.

FIG. 1 shows a method 100 for executing processes involving at least one primitive in a graphics processor, utilizing a data structure, in accordance with one embodiment.

As shown, a data structure is associated with at least one primitive. See operation 102. Additionally, a plurality of processes involving the at least one primitive are executed in a graphics processor, utilizing the data structure. See operation 104. In operation, the plurality of processes include at least one of: selecting at least one surface or portion thereof to which to render; or selecting at least one of a plurality of viewports.

In the context of the present description, a primitive refers to any element (e.g. a polygonal element, etc.) that is capable of being utilized to image a polygon (e.g. such as a triangle, a rectangle, etc.), or that is capable of being used to image a figure capable of being represented by polygons. Further, in the context of the present description, a data structure refers to any data representation capable of being utilized to store and/or organize data. For example, in one embodiment, the data structure may include a mask (e.g. a bitmask, etc.).

Furthermore, in the context of the present description, a viewport refers to a two-dimensional rectangle capable of being utilized to define a size of a rendering surface onto which a three-dimensional scene may be projected. In some cases, a viewport may also be used to specify a range of depth values on a render target surface into which a scene will be rendered.

As noted, in one embodiment, the plurality of processes may include selecting at least one surface or portion thereof to which to render. For example, in one embodiment, selecting at least one surface or portion thereof to which to render may include projecting the at least one primitive to one or more rendering targets. In another embodiment, the plurality of processes may include selecting at least one of a plurality of viewports. For example, in one embodiment, selecting at least one of a plurality of viewports may include projecting the at least one primitive to one or more of the viewports.

Of course, in one embodiment, the plurality of processes may include both selecting at least one surface (or portion thereof) to which to render and selecting at least one of a plurality of viewports. In one embodiment, the data structure for selecting the surface (or portion thereof) to which to render and the data structure for selecting the viewports may be different data structures. For example, in one embodiment, a render target array index may be configured to be offset by a viewport slot number.

Further, in one embodiment, the plurality of processes may include a null operation. In the context of the present description, a null operation refers to any operation and/or routine that returns no data values and leaves the program state unchanged. Of course, in various embodiments, the plurality of processes may include any number of processes, operations, and/or routines, etc. For example, in one embodiment, a primitive associated with a data structure that has no bits set to indicate a viewport, may be silently discarded such that no further processing is performed for that primitive.

In one embodiment, the plurality of processes may be initiated during a single pass of a pipeline of the graphics processor (e.g. a world-space pipeline portion, etc.). For example, in one embodiment (e.g. when processing primitives in a viewport order, etc.), a pipeline may read the data structure of a plurality of primitives included in a batch of primitives. In this case, in one embodiment, the pipeline may then process output primitives in the batch by traversing all output primitives for a particular viewport before moving on to a subsequent viewport (e.g. or the next viewport, etc.).

Additionally, in one embodiment, the data structure may be generated by a first stage of a pipeline of the graphics processor (e.g. a world-space pipeline portion, etc.). In this case, in one embodiment, the plurality of processes may executed by a second stage of the pipeline of the graphics processor that is subsequent to the first stage of the pipeline of the graphics processor. For example, in one embodiment, the first stage may include at least one of a vertex shader, a tessellation unit, and/or a geometry shader. In this case, in one embodiment, the second stage may include clip and cull unit. In various embodiments, the data structure may be generated by any units associated with the first stage of the pipeline of the graphics processor.

In the context of the present description, a vertex shader refers to any graphics processor related unit or units capable of transforming a three dimensional position of a vertex in virtual space to a two-dimensional coordinate (e.g. capable of being utilized for display, etc.). In one embodiment, the vertex shader may be configured to manipulate properties such as position, color, and texture coordinate.

Further, in the context of the present description, a tessellation unit refers to any unit or units associated with a graphics processor capable of being utilized to perform tessellation. Additionally, a geometry shader may refer to any unit or code that is capable of governing the processing of primitives. In one embodiment, the geometry shader may include a layered rendering capability. For example, in one embodiment, the geometry shader may cause a primitive to be rendered to a particular layer of a frame buffer.

In the context of the present description, the clip and cull unit refers to any unit or code capable of being utilized to perform culling and/or clipping operations on primitives. For example, in one embodiment, the clip and cull unit may include a unit capable of performing culling operations on geometric primitives falling within specific criteria, such as having an area less than a given size or a property outside of a numerical range limit.

As noted, in one embodiment, the data structure may include a mask. In this case, in one embodiment, bits of the mask may be utilized for selecting different surfaces or portions thereof to which to render, or selecting different viewports. For example, in one embodiment, the mask may include a bitmask, where each bit in the bitmask corresponds to a viewport slot at that bit position. In this case, in one embodiment, a set bit may indicate that a primitive is to be output to a corresponding viewport. Further, in one embodiment, multiple bits in the mask may be set, such that the same primitive may be output (e.g. multicast, etc.) to multiple viewports corresponding to the set bits. In one embodiment, when no bits are set in the mask, the primitive may be discarded and no further processing may be performed for that primitive.

The processes involving the primitive may include any process associated with the graphics processor. For example, in embodiment, the processes may be utilized in connection with an application including at least one of voxelization, cube mapping, rendering to surfaces at different resolutions (e.g. render MIP mapping, etc.), or cascaded shadow mapping. In another embodiment, the processes may be utilized in connection with an application including stereo output where a first viewport is selected for a right eye and a second viewport is selected for a left eye. In another embodiment, the plurality of processes may be utilized in connection with an application including position offsetting a plurality of coordinates of at least one vertex of the at least one primitive. For example, in one embodiment, a per-viewport offset may be implemented that is applied to a single position out of a vertex shader. In a more particular embodiment, a viewport-specific offset may be applied to a position in homogenous coordinate space, a priori to swizzle and perspective divide.

In various embodiments, this technique may be implemented in the context of stereo, as well as rendering shadowmaps for jittered area light sources where each viewport would have a different location on an area light. In one embodiment, this offset may be applied in homogeneous coordinates before a divide by a W coordinate. Accordingly, applying the offset before the perspective divide may allow for shifting a position of the camera, with near objects moving more than far objects for a given offset after the perspective divide.

In the context of the present description, voxelization refers to the synthesis of voxel-represented objects. Further, cube mapping refers to a technique of environment mapping that uses a cube as the map shape, where the environment is projected onto six faces of a cube and stored as six square textures, or unfolded into six regions of a single texture. Cascaded shadow mapping refers to a shadow mapping technique capable of being implemented by splitting a camera view frustum and creating a separate depth-map for each partition (e.g. in an attempt to make a screen error constant, etc.).

In another embodiment, the processes may be utilized in connection with an application including swizzling a plurality of coordinates of at least one vertex of the at least one primitive. In the context of the present description, swizzling refers to rearranging elements of a vector. In particular, swizzling refers to rearranging elements of the position vector X,Y,Z,W. Further, in one embodiment, may include negation of an element of the vector (e.g. −X, etc.).

In another embodiment, the processes may be utilized to avoid vertex expansion. For example, in one embodiment, all primitives that are sent to the same viewport may be processed consecutively to avoid vertex expansion.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
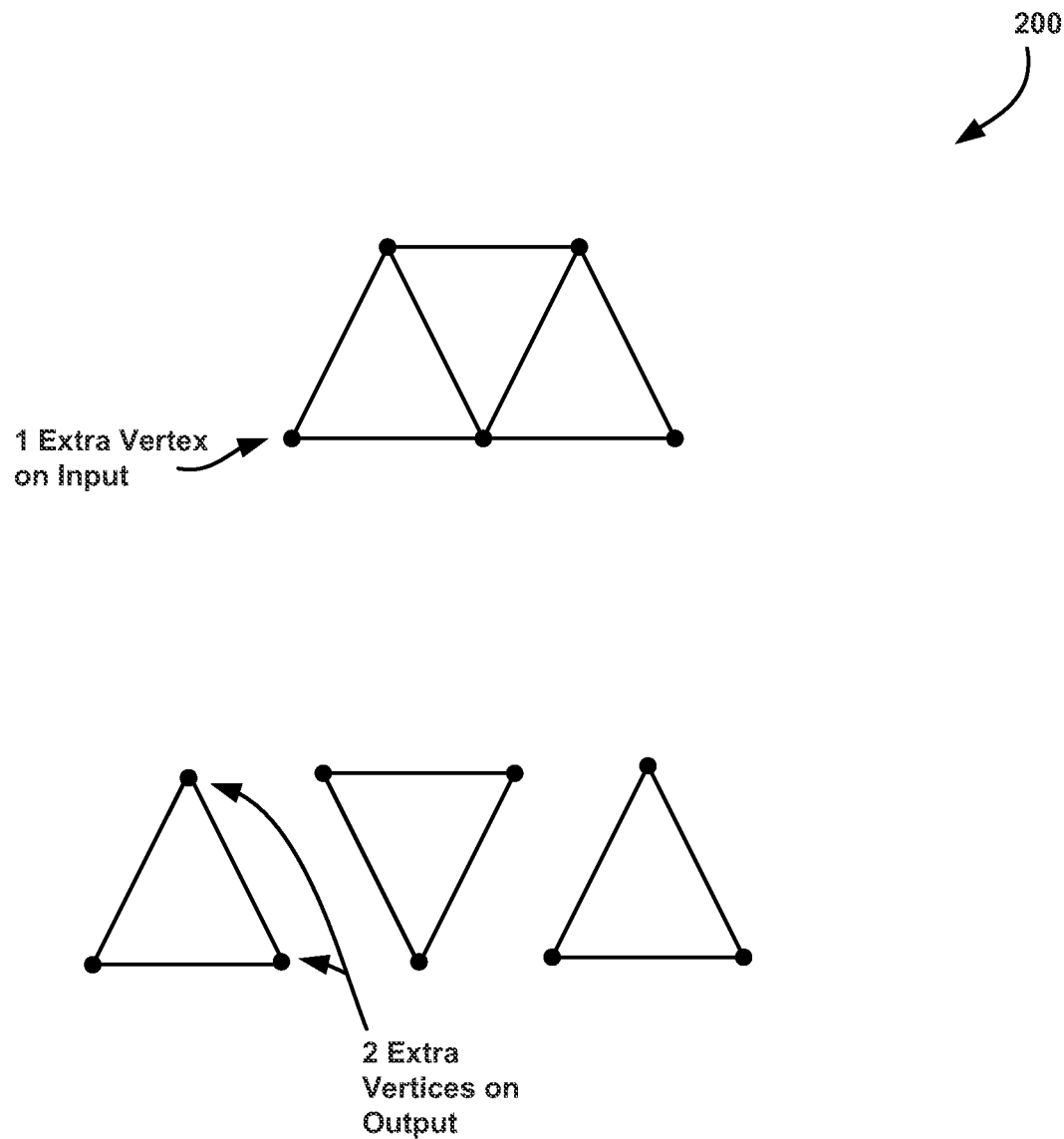
FIG. 2 shows an illustration of vertex expansion, in accordance with one embodiment.

FIG. 2 shows an illustration of vertex expansion 200, in accordance with one embodiment. As an option, the illustration 200 may be viewed in the context of the previous Figure and/or any subsequent Figure(s). Of course, however, the illustration 200 may be viewed in the context of any desired environment. It should also be noted that the aforementioned definitions may apply during the present description.

As shown, for triangle strips, if unique vertices are utilized for each triangle in a triangle strip for geometry shader processing, vertex expansion may occur. Accordingly, if it is desired to project primitives after a first stage of graphics processing (e.g. vertex/tessellation/geometry shading, etc.) to multiple viewports and/or render targets in an efficient manner, in one embodiment, sharing of vertices between adjacent primitives may be maintained for a particular projection.

As an example, in the case of voxelization, cube mapping, and/or cascaded shadow mapping, it may be desirable to project primitives to multiple viewports/render targets. In the case of voxelization, for example, in one embodiment, a geometry shader may be utilized to identify a dominant direction of a primitive. In this case, in one embodiment, the geometry shader may project the primitive to a corresponding three-dimensional volume.

In the case of cube mapping, in one embodiment, a geometry shader may be utilized to identify the faces of a cube map to which a primitive projects. In this case, in one embodiment, a multi-projection engine may project the primitive to each of the identified faces. Of course, it is desired that such projection occur in an efficient manner.

Accordingly, in one embodiment, world-space processing (e.g. a first stage, etc.) of a primitive may be performed exactly once. In one embodiment, the world-space processing of a primitive may be performed exactly once, regardless of a number of viewports/render targets a primitive is projected.

Furthermore, as noted, sharing of vertices between adjacent primitives may be maintained for a particular projection. In one embodiment, vertices between adjacent primitives may be maintained, in order to maintain a one new vertex per primitive ratio for triangle strips that all project to the same surface. Additionally, in one embodiment, a primitive may be completely culled if it does not project to any surface based on a world-space shader evaluation.

In the case of projecting a primitive to multiple viewports (i.e. viewport multi-cast, etc.), in one embodiment, a unit associated with a graphics processor (e.g. a shader, a tessellation unit, etc.) may specify a set of viewports into which a primitive is to be output. In one embodiment, a data structure may be associated with each primitive, where the data structure specifies the set of viewports to which a primitive is to be output.

In one embodiment, the data structure may include a form of a bitmask (e.g. a 16-bit bitmask, etc.), where each bit in the bitmask corresponds to a viewport slot at that bit position. For example, in one embodiment, a set bit in the bitmask may indicate that a primitive is to be output to a viewport that is associated with that bit position. In one embodiment, multiple bits may be set, in which case the same primitive may be output (e.g. multicast, etc.) to the viewports corresponding to the set bits. In the case that no bits are set in the mask, in one embodiment, the primitive may be silently discarded (e.g. killed, etc.) such that no further processing is performed for that primitive.

Furthermore, in one embodiment, a render target array index generated (e.g. by a geometry shader, etc.) may be configured to be offset by the viewport slot number for each output. In one embodiment, the offset render target array index may be implemented in concert with a non-expanding geometry shader implementation, which allows the geometry shader to run at virtually no overhead.

More information associated with non-expanding geometry shaders may be found in U.S. patent application Ser. No. 13/843,916, titled "SYSTEM, METHOD, AND COMPUTER PROGRAM PRODUCT FOR GENERATING PRIMITIVE SPECIFIC ATTRIBUTES," filed Mar. 15, 2013, published as US2014/0267276, which is incorporated herein by reference in its entirety.

As noted, viewport multi-cast may be implemented to avoid introducing vertex expansion by sharing vertices between adjacent primitives that are output to the same viewport. For example, in some cases, at least a portion of the graphics processing pipeline (e.g. a portion for performing clipping, culling, viewport transform, and perspective correction, etc.) may have a limited vertex cache. In this case, to ensure hits in the vertex cache, in one embodiment, all the primitives that are sent to the same viewport may be processed consecutively.

In some cases, processing the primitives consecutively may violate traditional API ordering for primitives, where the outputs for a given input primitive are generally all expected to be processed prior to the output of subsequent input primitives. Accordingly, in one embodiment, hardware and/or software associated with a GPU may automatically detect cases where it is legal to process primitives in a viewport order without violating API ordering rules. For example, in one embodiment, all render targets may be bound to NULL (e.g. during certain rendering, etc.), such that there are essentially no API imposed ordering requirements.

In another embodiment, a render target array index may be configured to be offset by the viewport slot number, the render target array index may be guaranteed not to wrap (e.g. by shader examination, etc.), and all primitives may have the same base render target array index (e.g. such as when an array index is not generated by a geometry shader, and a class default is used instead, etc.). In this case, in one embodiment, primitives may be processed in a viewport order since the viewports are guaranteed to go to different render targets, and there are no API imposed ordering requirements between different render targets. In yet another embodiment, the application may explicitly specify in the API whether to process primitives in a viewport order or in a strict primitive order. In yet another embodiment, hardware may be utilized to determine whether to process primitives in a viewport order or in a strict primitive order.

Further, in one embodiment, when processing primitives in a viewport order, a unit in the graphics processing pipeline (e.g. a unit for performing clipping, culling, viewport transform, and/or perspective correction, etc.), may read the viewport mask for all primitives in a batch, and may then process the output primitives in the batch by traversing all output primitives for a particular viewport before moving on to the next viewport. In one embodiment, when processing primitives in a strict primitive order, the pipeline portion (or unit, etc.) may process all output primitives (i.e. all viewports) for a particular input primitive before moving on to the next input primitive.

In another embodiment, the graphics processing pipeline (or a portion thereof) may be configured to implement viewport coordinate swizzling. In one embodiment, viewport coordinate swizzling may introduce additional coordinate transformation just after a vertex or geometry shader, and before a clipping and perspective divide. Specifically, in one embodiment, viewport coordinate swizzling may introduce additional coordinate transformation just after a vertex or geometry shader, and before a clipping, culling, viewport transform and perspective divide. In one embodiment, the transformation may include a programmable permutation over vertex position coordinate components (x, y, z, w) with optional negation. Further, in one embodiment, the transformation may be specified as part of viewport state, and may take the form of a mask (e.g. a 12-bit mask, etc.). For example, in one embodiment, the mask may include three bits per coordinate, to pick one out of eight choices for each coordinate: +x, −x, +y, −y, +z, −z, +w, −w.

In various embodiments, several different swizzling transformations may be specified by using different viewports (e.g. one per viewport, etc.). In this case, in one embodiment, the geometry shader may then pick a desired swizzling transformation by routing output primitives to the corresponding viewport. In one embodiment, this feature may be implemented in concert with a non-expanding geometry shader implementation.

Still yet, in another embodiment, the graphics processing pipeline (or a portion thereof) may be configured to implement single-pass stereo output. Traditionally, stereo output is performed by rendering twice, once for a left eye perspective and once for a right eye perspective, with a different position computed for each projection. In this case, it is possible that only the x-coordinate differs between the two projections.

Accordingly, in one embodiment, a viewport multi-cast may be utilized to output each primitive to two viewports, representing the two eyes, and a different set of position attributes generated by the world-space shader pipeline may be selected that corresponds to each viewport. For example, in one embodiment, the world-space pipeline may compute two sets of positions, and a unit in the pipeline or a portion of the pipeline (e.g. a unit for performing clipping, culling, viewport transform, and/or perspective correction, etc.), may associate each set of positions with a particular viewport (e.g. otherwise vertices have a common set of attributes for the two viewports, etc.). In various embodiments, the position attributes can be provided as a pair, one for each eye, by the geometry shader, and also can be provided as a position for a left eye and an offset position attribute for a right eye (and vice versa). This makes it possible to perform world-space processing just once with additional computation of position for each viewport.

Utilizing these techniques, unnecessary expansion of vertices due to a geometry shader generating unique vertices for each primitive may be avoided. In some embodiments, this may improve a primitive processing rate, avoiding the overhead of additional attribute traffic and attribute storage in the pipeline. Furthermore, in some embodiments, the geometry shader shading workload may be reduced by moving the operations of multi-cast and coordinate swizzle into fixed function hardware.

Figure 3:
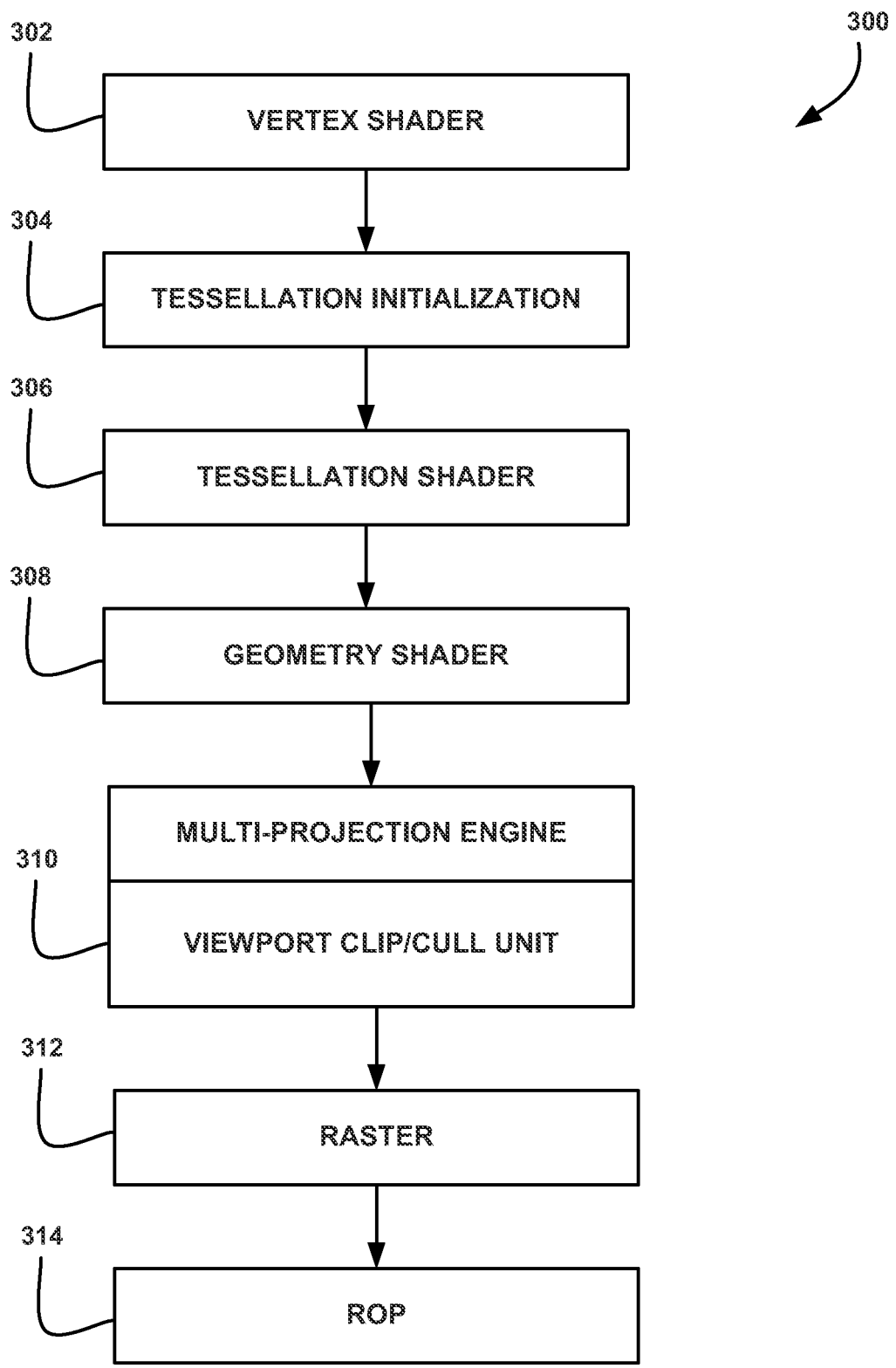
FIG. 3 shows a graphics processing pipeline, in accordance with one embodiment.

FIG. 3 shows a graphics processing pipeline 300, in accordance with one embodiment. As an option, the graphics processing pipeline 300 may be implemented in the context of the functionality and architecture of the previous Figures and/or any subsequent Figure(s). Of course, however, the graphics processing pipeline 300 may be implemented in any desired environment. It should also be noted that the aforementioned definitions may apply during the present description.

As shown, the graphics processing pipeline 300 may include at least one vertex shader 302, a tessellation initialization unit 304, a tessellation shader 306, and a geometry shader 308. In one embodiment, the vertex shader 302, the tessellation initialization unit 304, the tessellation shader 306, the geometry shader 308, and/or hardware/software associated therewith, may represent a first stage of the graphics processing pipeline 300 (e.g. a "world-space shader pipeline," or "shader pipeline," etc.).

Furthermore, in one embodiment, the graphics processing pipeline 300 may include a viewport clip/cull unit 310, including a multi-projection engine, a raster unit 312, and a raster operations (ROP) unit 314. In one embodiment, the shader pipeline may operate within a shader multiprocessor. Further, in one embodiment, the shader pipeline may include a plurality of shader units that may be enabled to process primitive data. In one embodiment, the vertex shader 302, the tessellation initialization unit 304, the tessellation shader 306, the geometry shader 308, and/or hardware/software associated therewith, may sequentially perform processing operations. Once the sequential processing operations performed by the shaders within shader pipeline are complete, in one embodiment, the viewport clip/cull unit 310 may utilize the data.

In one embodiment, primitive data processed by the shader pipeline may be written to cache (e.g. L1 cache, a vertex cache, etc.). In this case, in one embodiment, the viewport clip/cull unit 310 may access the data in the cache. In one embodiment, the viewport clip/cull unit 310 may perform clipping, culling, perspective correction, and viewport scaling operations on primitive data.

In one embodiment, the viewport clip/cull unit 310 may be configured to perform a bounding-box calculation with the primitives to determine which region of a display each graphics primitive belongs. In one embodiment, this information may be used to route each primitive to one of a plurality of raster units, such as raster unit 312. In one embodiment, each raster unit may rasterize graphics primitives and fragments of graphics primitives that overlap a particular region of the display. In one embodiment, the raster operations unit 314 may include a processing unit that performs raster operations, such as stencil, z test, and the like, and may output pixel data as processed graphics data.

In operation, the viewport clip/cull unit 310 may be configured to read a data structure associated with a primitive. For example, in one embodiment, the viewport clip/cull unit 310 may read a mask for all primitives in a batch. In one embodiment, the viewport clip/cull unit 310 may read the mask for each primitive from a provoking vertex associated with the primitive. Furthermore, each primitive in a batch includes a mask. The viewport clip/cull unit 310 may then process the output primitives in the batch by traversing all output primitives for a particular viewport before moving on to the next viewport. In another embodiment, the viewport clip/cull unit 310 may process all output primitives (i.e. all viewports, etc.) for a particular input primitive before moving on to the next input primitive.

Figure 4:
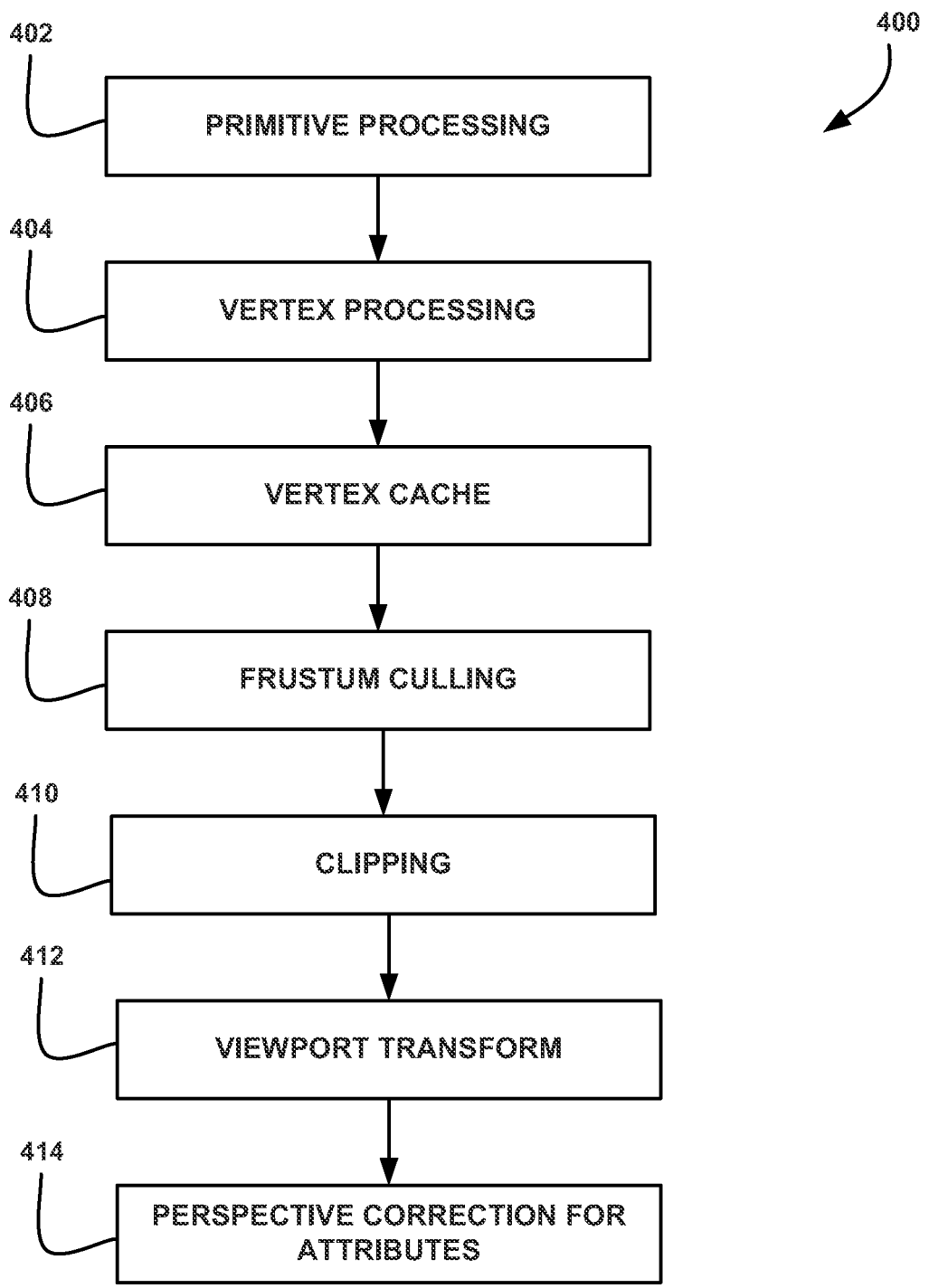
FIG. 4 shows a viewport clip/cull unit pipeline, in accordance with one embodiment.

FIG. 4 shows a viewport clip/cull unit pipeline 400, in accordance with one embodiment. As an option, the viewport clip/cull unit pipeline 400 may be implemented in the context of the functionality and architecture of the previous Figures and/or any subsequent Figure(s). Of course, however, the viewport clip/cull unit pipeline 400 may be implemented in any desired environment. It should also be noted that the aforementioned definitions may apply during the present description.

As shown, in one embodiment, the viewport clip/cull unit pipeline 400 may include a primitive processing unit 402, a vertex processing unit 404, a vertex cache 406, a frustum culling unit 408, a clipping unit 410, a viewport transform unit 412, and a perspective correction unit 414 for attributes.

In operation, the viewport clip/cull unit pipeline 400 may perform a primitive fetch operation utilizing the primitive processing unit 402 and a vertex fetch operation utilizing the vertex processing unit 404. In one embodiment, the vertex fetch operation may include checking the vertex cache 406 for a vertex. For example, in one embodiment, the vertex cache 406 may be utilized to store vertex values.

Further, in one embodiment, the frustum culling unit 408 may be utilized to remove objects (e.g. primitives, etc.) that lie completely outside a viewing frustum (e.g. from a rendering process, etc.). Additionally, the clipping unit 410 may be utilized to clip any primitive that is clipped. Still yet, the viewport transform unit 412 may perform viewport transformation where desired. Furthermore, perspective correction for attributes may be performed utilizing the perspective correction unit 414.

In operation, the viewport clip/cull unit pipeline 400 may be configured to read a data structure associated with a primitive. For example, in one embodiment, the viewport clip/cull unit pipeline 400 may read a per-primitive specific mask from the provoking vertex for each primitive in a batch. The viewport clip/cull unit pipeline 400 may then process the output primitives in the batch by traversing all output primitives for a particular viewport before moving on to the next viewport. In another embodiment, the viewport clip/ cull unit pipeline 400 may process all output primitives (i.e. all viewports, etc.) for a particular input primitive before moving on to the next input primitive.

Figure 5:
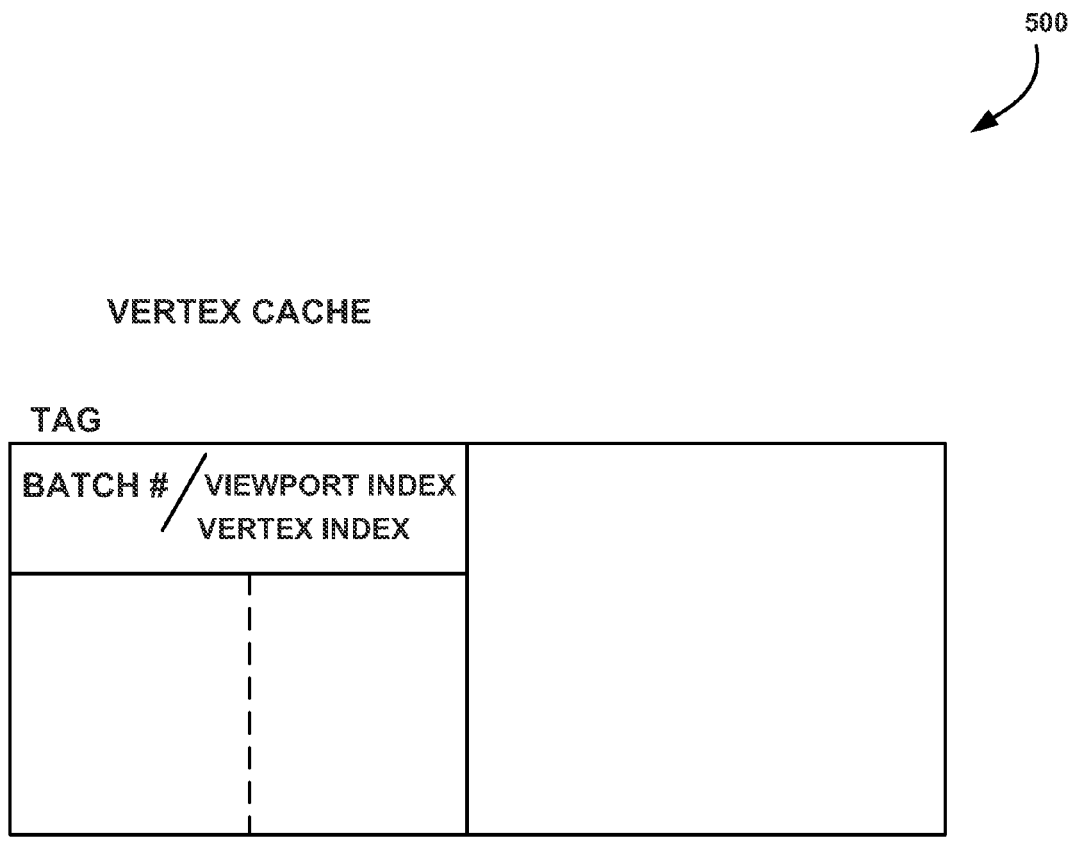
FIG. 5 shows an exemplary viewport clip/cull unit vertex cache data structure, in accordance with one embodiment.

FIG. 5 shows an exemplary viewport clip/cull unit vertex cache data structure 500, in accordance with one embodiment. As an option, the vertex cache data structure 500 may be implemented in the context of the functionality and architecture of the previous Figures and/or any subsequent Figure(s). Of course, however, vertex cache data structure 500 may be implemented in any desired environment. It should also be noted that the aforementioned definitions may apply during the present description.

As shown, in one embodiment, the viewport clip/cull unit vertex cache data structure 500 may include a tag including a primitive batch number. In various embodiments, the batch may be associated with any number of primitives. As shown further, the viewport clip/cull unit vertex cache data structure 500 may include a viewport index and/or a vertex index for every vertex associated with the batch number.

Figure 6:
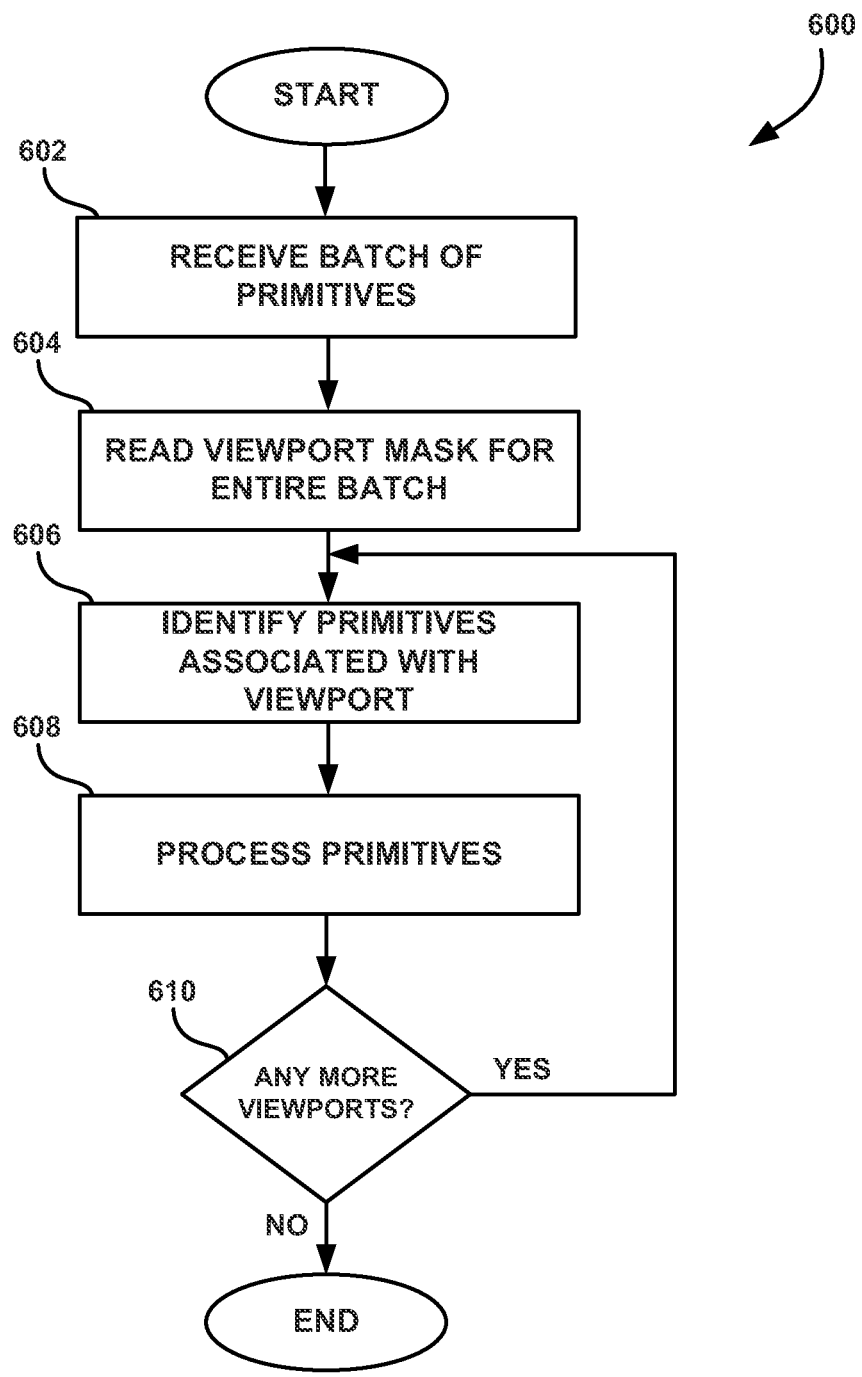
FIG. 6 shows a method for executing processes involving at least one primitive in a graphics processor, in accordance with another embodiment.

FIG. 6 shows a method 600 for executing processes involving at least one primitive in a graphics processor, in accordance with another embodiment. As an option, the present method 600 may be implemented in the context of the functionality and architecture of the previous Figures and/or any subsequent Figure(s). Of course, however, the method 600 may be carried out in any desired environment. It should also be noted that the aforementioned definitions may apply during the present description.

As shown, a batch of primitives is received. See operation 602. Further, a viewport mask is read for each primitive in the entire batch of primitives. See operation 604. For example, in one embodiment, each primitive may be associated with a viewport mask. In this case, each viewport mask for each primitive may be read.

Additionally, utilizing the mask, primitives associated with viewports are identified. See operation 606. For example, in one embodiment, each bit in the mask may correspond to a viewport (or viewport slot, etc.) at that bit position. In one embodiment, a set bit (e.g. a '1', etc.) may indicate that a primitive is to be output to the corresponding viewport. Further, in one embodiment, multiple bits in the mask of a primitive may be set. In this case, in one embodiment, the same primitive may be output to the viewports corresponding to the set bits.

Based on the mask information, the primitives are processed. See operation 608. Furthermore, it may be determined whether any more any primitives in the batch of primitives correspond to any more viewports. See decision 610. If it is determined that primitives in the batch of primitives correspond to additional viewports, the primitives are identified and processed.

Figure 7:
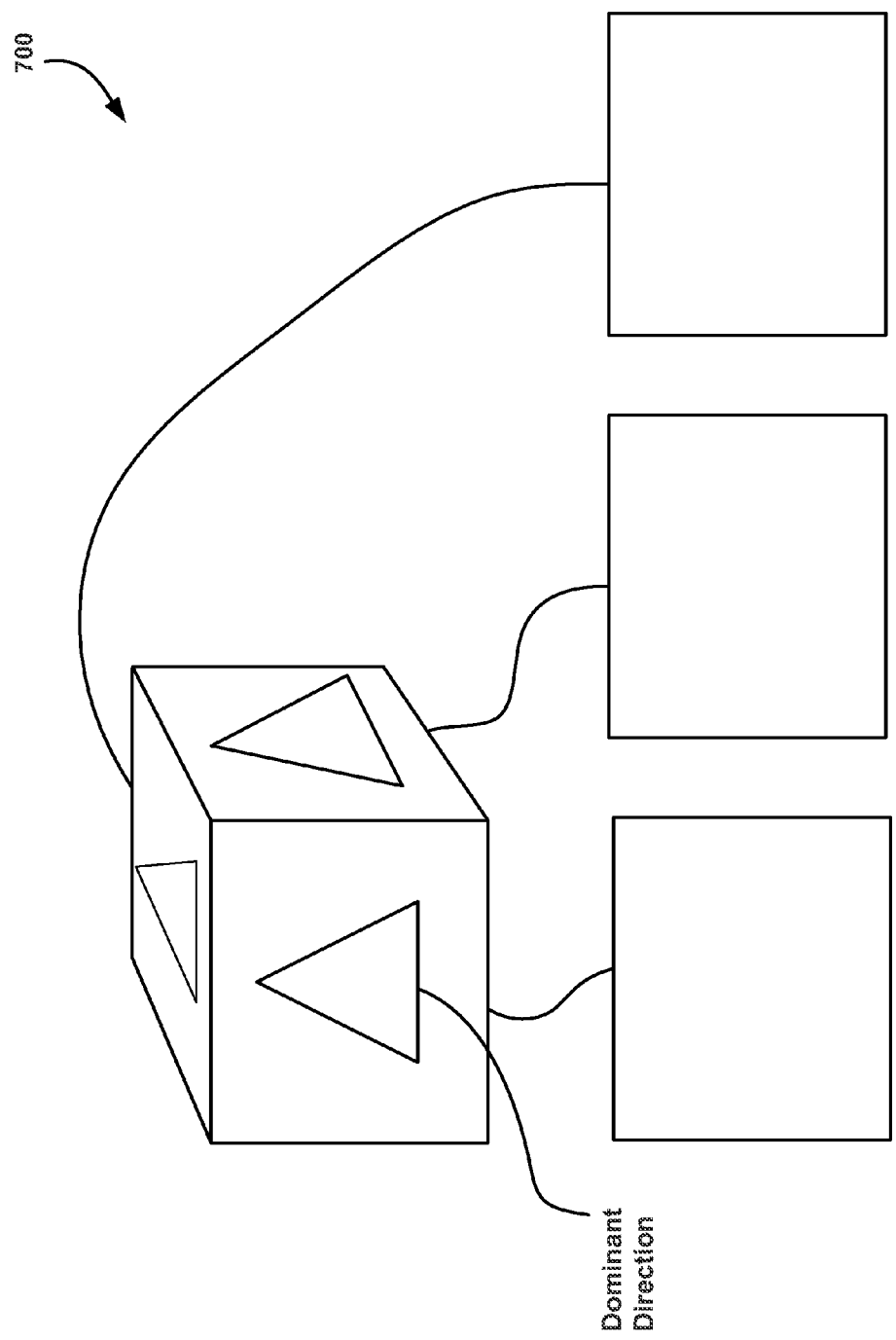
FIG. 7 shows an illustration of a voxelization implementation, in accordance with one embodiment.

FIG. 7 shows an illustration of a voxelization implementation 700, in accordance with one embodiment. As an option, the illustration 700 may be viewed in the context of the previous Figures and/or any subsequent Figure(s). Of course, however, the illustration 700 may be viewed in the context of any desired environment. It should also be noted that the aforementioned definitions may apply during the present description.

In the context of the present description, voxelization refers to the synthesis of voxel-represented objects. A voxel refers to any volume element representing a value on a regular grid in three-dimensional space. In one embodiment, a unit in a graphics processing pipeline (e.g. a geometry shader, etc.) may identify a dominant direction of a primitive and may project the primitive to corresponding three-dimensional volume. In one embodiment, the dominant direction may be determined by determining a normal associated with a primitive. Of course, in one embodiment, the primitive may be projected in a multicast manner, as described herein.

Figure 8:
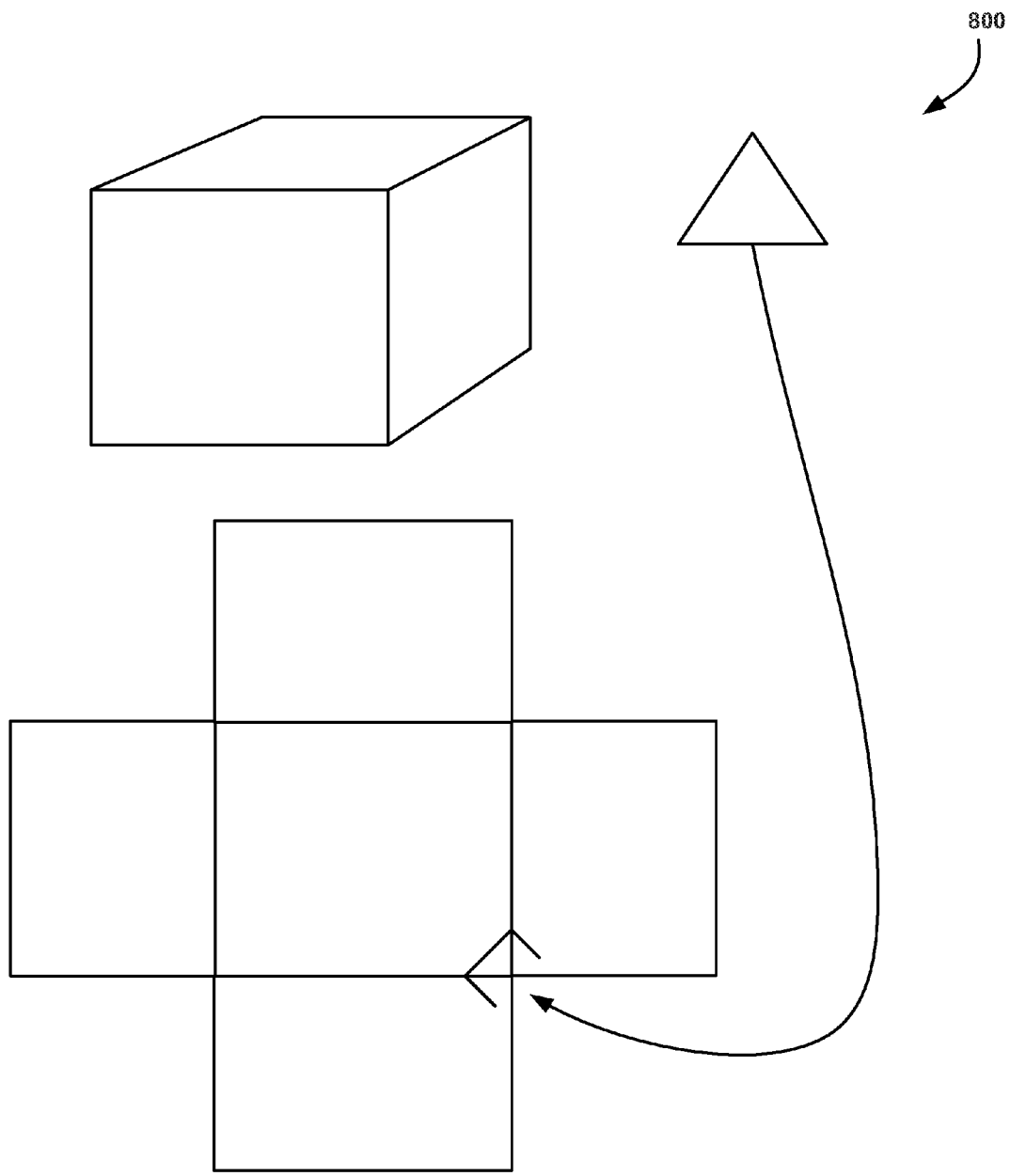
FIG. 8 shows an illustration of a cube mapping implementation, in accordance with one embodiment.

FIG. 8 shows an illustration of a cube mapping implementation 800, in accordance with one embodiment. As an option, the illustration 800 may be viewed in the context of the previous Figures and/or any subsequent Figure(s). Of course, however, the illustration 800 may be viewed in the context of any desired environment. It should also be noted that the aforementioned definitions may apply during the present description.

Figure 9:
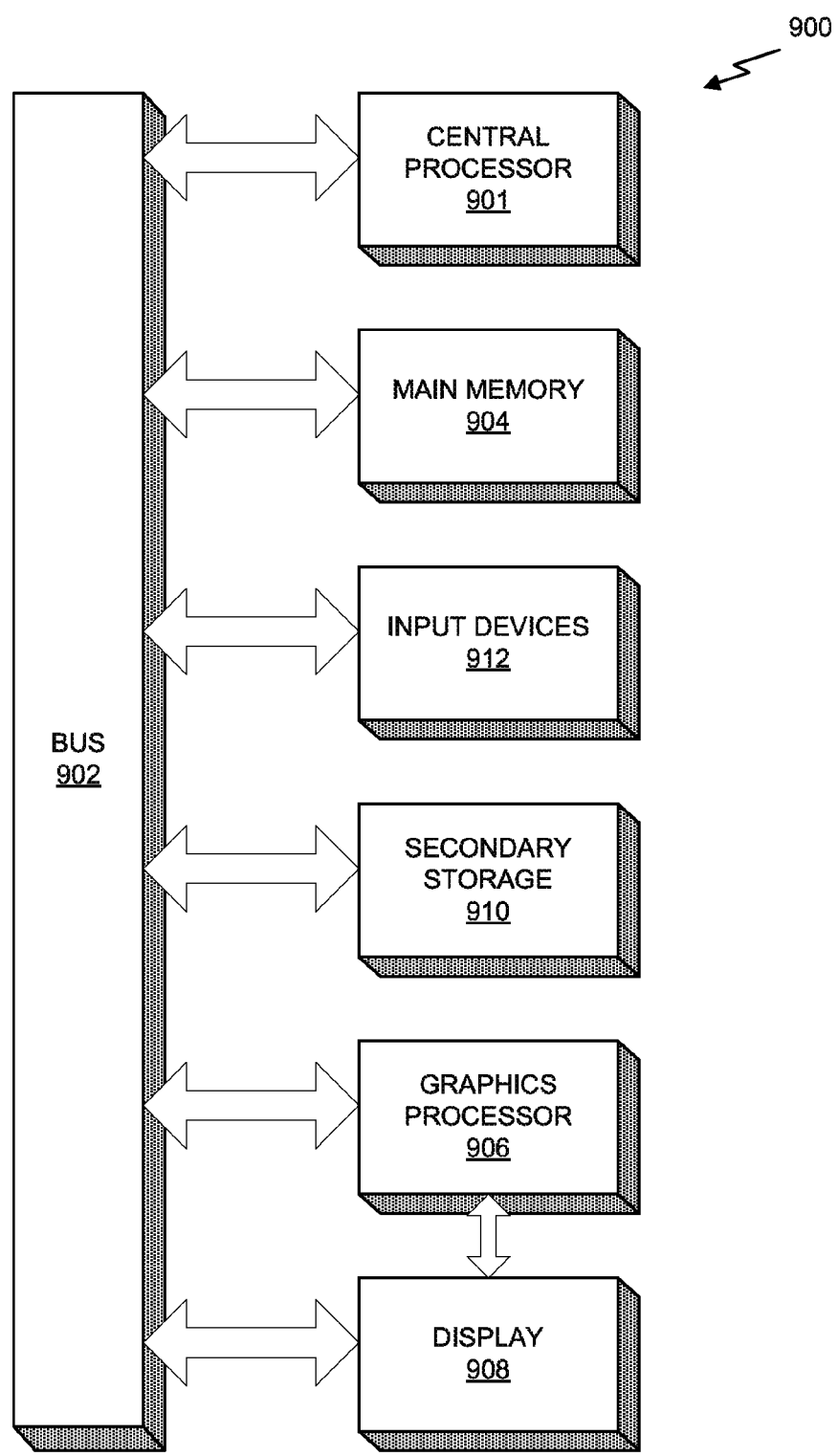
FIG. 9 illustrates an exemplary system in which the various architecture and/or functionality of the various previous embodiments may be implemented.

In the context of the present description, cube mapping refers to any technique of environment mapping that uses a cube as the map shape, where the environment is projected onto six faces of a cube and stored as six square textures, or unfolded into six regions of a single texture. In one embodiment, a unit in a graphics processing pipeline (e.g. a geometry shader, etc.) may identify faces of the cube map to which a primitive projects. Further, in one embodiment, a multi-projection aspect of the graphics processing pipeline may be utilized to project the primitive to each of the identified faces, utilizing the techniques described herein FIG. 9 illustrates an exemplary system 900 in which the various architecture and/or functionality of the various previous embodiments may be implemented. As shown, a system 900 is provided including at least one central processor 901 that is connected to a communication bus 902. The communication bus 902 may be implemented using any suitable protocol, such as PCI (Peripheral Component Interconnect), PCI-Express, AGP (Accelerated Graphics Port), HyperTransport, or any other bus or point-to-point communication protocol(s). The system 900 also includes a main memory 904. Control logic (software) and data are stored in the main memory 904 which may take the form of random access memory (RAM).

The system 900 also includes input devices 912, a graphics processor 906, and a display 908, i.e. a conventional CRT (cathode ray tube), LCD (liquid crystal display), LED (light emitting diode), plasma display or the like. User input may be received from the input devices 912, e.g., keyboard, mouse, touchpad, microphone, and the like. In one embodiment, the graphics processor 906 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 904 and/or the secondary storage 910. Such computer programs, when executed, enable the system 900 to perform various functions. The main memory 904, the storage 910, and/or any other storage are possible examples of computer-readable media.

In one embodiment, the architecture and/or functionality of the various previous figures may be implemented in the context of the central processor 901, the graphics processor 906, an integrated circuit (not shown) that is capable of at least a portion of the capabilities of both the central processor 901 and the graphics processor 906, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, laptop computer, server, workstation, game consoles, embedded system, and/or any other type of logic. Still yet, the system 900 may take the form of various other devices including, but not limited to a personal digital assistant (PDA) device, a mobile phone device, a television, etc.

Further, while not shown, the system 900 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   generating a bit mask for a primitive, by a graphics processor, wherein:
   (a) each bit in the bit mask corresponds with a different surface or portion thereof to be rendered by the graphics processor and when set indicates that the primitive is to be projected onto one of the different surfaces or portions thereof corresponding to the bit, or
   (b) each bit in the bit mask corresponds with a different viewport and when set indicates that the primitive is to be output to one of the different viewports corresponding to the bit, each of the viewports being a two-dimensional rectangle at a different position and further each of the viewports being a different size; and
   executing, by the graphics processor, a plurality of processes involving the primitive, utilizing the bit mask, wherein the plurality of processes includes:
   when each bit in the bit mask corresponds with a different surface or portion thereof, then for each bit set in the bit mask selecting the corresponding surface or portion thereof and projecting the primitive onto each selected surface or portion thereof, and
   when each bit in the bit mask corresponds with a different viewport, then for each bit set in the bit mask selecting the corresponding viewport and projecting the primitive onto each selected viewport.

2. The method of claim 1, wherein the plurality of processes are initiated during a single pass of a pipeline of the graphics processor.

3. The method of claim 1, wherein the bit mask is generated by a first stage of a pipeline of the graphics processor, and the plurality of processes are executed by a second stage of the pipeline of the graphics processor that is subsequent to the first stage of the pipeline of the graphics processor.

4. The method of claim 3, wherein the first stage includes at least one of a vertex shader, a tessellation initialization shader, a tessellation shader, or a geometry shader.

5. The method of claim 3, wherein the second stage includes a culling, clipping, viewport transform and perspective correction unit.

6. The method of claim 1, wherein the plurality of processes are utilized in connection with an application including at least one of voxelization, cube mapping, rendering to surfaces at different resolutions, or cascaded shadow mapping.

7. The method of claim 1, wherein the plurality of processes are utilized in connection with an application capable of swizzling a plurality of coordinates of at least one vertex of the primitive.

8. The method of claim 1, and further comprising:
   generating an additional bit mask for an additional primitive;
   determining whether the graphics processor is capable of operating in a viewport order mode in which there are no application programming interface (API) rules imposing ordering requirements between different primitives such that consecutive processing of the primitive and at least one additional primitive is allowed; and
   when it is determined that the graphics processor is capable of operating in the viewport order mode, executing, in a viewport order, the plurality of processes involving the primitive, utilizing the bit mask, and the plurality of processes involving the additional primitive, utilizing the additional bit mask;
   when it is determined that the graphics processor is not capable of operating in the viewport order mode, executing, in a primitive order specified by the API rules, the plurality of processes involving the primitive, utilizing the bit mask, and the plurality of processes involving the additional primitive, utilizing the additional bit mask.

9. The method of claim 1, wherein the plurality of processes are utilized to avoid vertex expansion.

10. The method of claim 1, wherein each bit in the bit mask corresponds with a different surface or portion thereof, and the plurality of processes are utilized in connection with an application capable of applying a viewport-specific transform after the selection.

11. The method of claim 1, wherein generating the bit mask includes setting multiple bits in the bit mask, such that:
    when each bit in the bit mask corresponds with a different surface or portion thereof, then the primitive is projected by the graphics processor onto multiple surfaces or portions thereof corresponding to the multiple set bits, and
    when each bit in the bit mask corresponds with a different viewport, then the primitive is projected by the graphics processor onto multiple viewports corresponding to the multiple set bits.

12. The method of claim 1, wherein each of the viewports offsets to a different surface.

13. A computer program product embodied on a non-transitory computer readable medium including code adapted to be executed by a graphics processor to perform a method comprising:
- generating a bit mask for a primitive, by a graphics processor, wherein:
  - (a) each bit in the bit mask corresponds with a different surface or portion thereof to be rendered by the graphics processor and when set indicates that the primitive is to be projected onto one of the different surfaces or portions thereof corresponding to the bit, or
  - (b) each bit in the bit mask corresponds with a different viewport and when set indicates that the primitive is to be output to one of the different viewports corresponding to the bit, each of the viewports being a two-dimensional rectangle at a different position and further each of the viewports being a different size; and
- executing, by the graphics processor, a plurality of processes involving the primitive, utilizing the bit mask, wherein the plurality of processes includes:
- when each bit in the bit mask corresponds with a different surface or portion thereof, then for each bit set in the bit mask selecting the corresponding surface or portion thereof and projecting the primitive onto each selected surface or portion thereof, and
- when each bit in the bit mask corresponds with a different viewport, then for each bit set in the bit mask selecting the corresponding viewport and projecting the primitive onto each selected viewport.

14. A sub-system, comprising:
- a graphics processor for:
- generating a bit mask for a primitive, wherein:
  - (a) each bit in the bit mask corresponds with a different surface or portion thereof to be rendered by the graphics processor and when set indicates that the primitive is to be projected onto one of the different surfaces or portions thereof corresponding to the bit, or
  - (b) each bit in the bit mask corresponds with a different viewport and when set indicates that the primitive is to be output to one of the different viewports corresponding to the bit, each of the viewports being a two-dimensional rectangle at a different position and further each of the viewports being a different size; and
- executing a plurality of processes involving the primitive, utilizing the bit mask, wherein the plurality of processes includes:
- when each bit in the bit mask corresponds with a different surface or portion thereof, then for each bit set in the bit mask selecting the corresponding surface or portion thereof and projecting the primitive onto each selected surface or portion thereof, and
- when each bit in the bit mask corresponds with a different viewport, then for each bit set in the bit mask selecting the corresponding viewport and projecting the primitive onto each selected viewport.

15. A method, comprising:
- generating a bit mask for a primitive, by a graphics processor, wherein:
  - (a) each bit in the bit mask corresponds with a different surface or portion thereof to be rendered by the graphics processor and when set indicates that the primitive is to be projected onto one of the different surfaces or portions thereof corresponding to the bit, or
  - (b) each bit in the bit mask corresponds with a different viewport and when set indicates that the primitive is to be output to one of the different viewports corresponding to the bit, each of the viewports being a two-dimensional rectangle at a different position and further each of the viewports defines a different size and a range of depth values; and
- executing, by the graphics processor, a plurality of processes involving the primitive, utilizing the bit mask, wherein the plurality of processes includes:
- when each bit in the bit mask corresponds with a different surface or portion thereof, then for each bit set in the bit mask selecting the corresponding surface or portion thereof and projecting the primitive onto each selected surface or portion thereof, and when each bit in the bit mask corresponds with a different viewport, then for each bit set in the bit mask selecting the corresponding viewport and projecting the primitive onto each selected viewport.

16. A sub-system, comprising:
- a graphics processor for:
- generating a bit mask for a primitive, wherein:
  - (a) each bit in the bit mask corresponds with a different surface or portion thereof to be rendered by the graphics processor and when set indicates that the primitive is to be projected onto one of the different surfaces or portions thereof corresponding to the bit, or
  - (b) each bit in the bit mask corresponds with a different viewport and when set indicates that the primitive is to be output to one of the different viewports corresponding to the bit, each of the viewports being a two-dimensional rectangle at a different position and further each of the viewports being a different size and/or offsetting to a different surface; and
- executing a plurality of processes involving the primitive, utilizing the bit mask, wherein the plurality of processes includes:
- when each bit in the bit mask corresponds with a different surface or portion thereof, then for each bit set in the bit mask selecting the corresponding surface or portion thereof and projecting the primitive onto each selected surface or portion thereof, and
- when each bit in the bit mask corresponds with a different viewport, then for each bit set in the bit mask selecting the corresponding viewport and projecting the primitive onto each selected viewport;
- computing, by a pipeline of the graphics processor, a first position corresponding to a first eye of a viewer and a second position corresponding to a second eye of the viewer;
- associating, by the pipeline of the graphics processor, the first position with a first one of the viewports and the second position with the second one of the viewports;
- wherein generating the bit mask for the primitive includes setting the bit in the bit mask corresponding to the first viewport and setting the bit in the bit mask corresponding to the second viewport such that, during execution of the plurality of processes by the graphics processor, the primitive is output to each of the first viewport having the first position corresponding to the first eye of the viewer and the second viewport having the second position corresponding to the second eye of the viewer.

17. The sub-system of claim 16, wherein the second position is defined as an offset to the first position such that world-space processing of the primitive is performed only once by the graphics processor with additional computation of position of the primitive for each of the first viewport and the second viewport.

18. A method, comprising:
  generating a bit mask for a primitive, by a graphics processor, wherein:
  (a) each bit in the bit mask corresponds with a different surface or portion thereof to be rendered by the graphics processor and when set indicates that the primitive is to be projected onto one of the different surfaces or portions thereof corresponding to the bit, or
  (b) each bit in the bit mask corresponds with a different viewport and when set indicates that the primitive is to be output to one of the different viewports corresponding to the bit, each of the viewports being a two-dimensional rectangle at a different position and further each of the viewports being a different size and/or offsetting to a different surface; and
  executing, by the graphics processor, a plurality of processes involving the primitive, utilizing the bit mask, wherein the plurality of processes includes:
  when each bit in the bit mask corresponds with a different surface or portion thereof, then for each bit set in the bit mask selecting the corresponding surface or portion thereof and projecting the primitive onto each selected surface or portion thereof, and
  when each bit in the bit mask corresponds with a different viewport, then for each bit set in the bit mask selecting the corresponding viewport and projecting the primitive onto each selected viewport;
  generating an additional bit mask for an additional primitive;
  determining whether the graphics processor is capable of operating in a viewport order mode in which there are no application programming interface (API) rules imposing ordering requirements between different primitives such that consecutive processing of the primitive and at least one additional primitive is allowed; and
  when it is determined that the graphics processor is capable of operating in the viewport order mode, executing, in a viewport order, the plurality of processes involving the primitive, utilizing the bit mask, and the plurality of processes involving the additional primitive, utilizing the additional bit mask;
  when it is determined that the graphics processor is not capable of operating in the viewport order mode, executing, in a primitive order specified by the API rules, the plurality of processes involving the primitive, utilizing the bit mask, and the plurality of processes involving the additional primitive, utilizing the additional bit mask;
  when processing the primitive and the additional primitive in the viewport order, the graphics processor reads the bit mask for the primitive and the bit mask for the additional primitive and processes the primitive and the additional primitive for a particular one of the viewports before processing the primitive and the additional primitive for a next one of the viewports; and
  when processing the primitive and the additional primitive in the primitive order, the graphics processor processes the primitive for each of the viewports before processing the additional primitive for each of the viewports.

* * * * *